(12) United States Patent
Kim et al.

(10) Patent No.: US 9,100,627 B2
(45) Date of Patent: Aug. 4, 2015

(54) ELECTRONIC DEVICE AND METHOD OF CONTROLLING THE SAME

(75) Inventors: Jaehong Kim, Seoul (KR); Haesoo Lee, Seoul (KR); Woohyun Paik, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 258 days.

(21) Appl. No.: 13/046,495

(22) Filed: Mar. 11, 2011

(65) Prior Publication Data
US 2011/0258667 A1    Oct. 20, 2011

(30) Foreign Application Priority Data
Apr. 16, 2010    (KR) .................. 10-2010-0035116

(51) Int. Cl.
| | | |
|---|---|---|
| *H04N 7/18* | (2006.01) | |
| *H04N 5/63* | (2006.01) | |
| *H04N 5/445* | (2011.01) | |
| *H04N 21/433* | (2011.01) | |
| *H04N 21/442* | (2011.01) | |
| *H04N 21/458* | (2011.01) | |
| H04N 21/478 | (2011.01) | |

(52) U.S. Cl.
CPC ............ *H04N 5/63* (2013.01); *H04N 5/44543* (2013.01); *H04N 21/4334* (2013.01); *H04N 21/44209* (2013.01); *H04N 21/458* (2013.01); *H04N 21/478* (2013.01)

(58) Field of Classification Search
CPC . H04N 21/4131; H04N 5/63; H04N 5/44543; H04N 21/4334; H04N 21/44209; H04N 21/458; H04N 21/478
USPC .......................................... 725/79, 80
See application file for complete search history.

(56) References Cited

U.S. PATENT DOCUMENTS

| | | | | |
|---|---|---|---|---|
| 6,731,346 | B1 * | 5/2004 | Nonomura et al. | 348/554 |
| 2008/0018810 | A1 * | 1/2008 | Moriiwa | 348/794 |
| 2010/0321574 | A1 * | 12/2010 | Kerofsky | 348/563 |
| 2011/0047394 | A1 * | 2/2011 | Sato | 713/310 |
| 2011/0153108 | A1 * | 6/2011 | Yoon et al. | 700/295 |

OTHER PUBLICATIONS

U.S. Appl. No. 12/490,975, filed Apr. 2010, Shimaya.*

* cited by examiner

*Primary Examiner* — Pankaj Kumar
*Assistant Examiner* — Alazar Tilahun
(74) *Attorney, Agent, or Firm* — Birch, Stewart, Kolasch & Birch, LLP

(57) ABSTRACT

An electronic device and a method of controlling the electronic device are provided. The electronic device includes a broadcast receiving unit that receives a broadcast content, a communication unit that receives power information associated with a mart grid, the power information including at least one of per-time slot electricity rate information and power demand information, and a controller that selectively performs one of an operation of outputting the broadcast content received through the broadcast receiving unit and an operation of storing the received broadcast content in an internal memory or an external memory considering the received power information.

20 Claims, 20 Drawing Sheets

| TIME AND ELECTRICITY RATE CHANNEL | 10:00 | 10:30 | 11:00 | 11:30 | |
|---|---|---|---|---|---|
| | $100 | $102 | $104 | $106 | $108 |
| FIRST CHANNEL | PR1 | | PR2 | | PR3 |
| SECOND CHANNEL | PR4 | | | PR5 | PR6 |
| THIRD CHANNEL | PR7 | | PR8 | PR9 | |

ELECTRONIC DEVICE AND METHOD OF CONTROLLING THE SAME

This nonprovisional application claims priority under 35 U.S.C. §119(a) on Patent Application No. 10-2010-0035116 filed in Republic of Korea on Apr. 16, 2010 the entire contents of which are hereby incorporated by reference.

BACKGROUND

1. Field

The present disclosure is directed to an electronic device having an energy saving function and a method of controlling the electronic device.

2. Related Art

The introduction of smart grids for efficient use of electric power in places requiring electric power may lead to a differential pricing system in which electricity rates are varied depending on electricity demand. There is a need for developing a technology that may efficiently control various home electronic devices according to the introduction of smart grids.

SUMMARY

Exemplary embodiments of the present invention provide an electronic device that may save electricity rates and a method of controlling the electronic device.

The present is not limited to the above embodiments. Other embodiments of the present invention will become apparent by one or ordinary skill in the art from the detailed description in conjunction with the accompanying drawings.

According to an embodiment of the present invention, there is provided an electronic device comprising a broadcast receiving unit configured to receive a broadcast content, a communication unit configured to receive power information associated with a smart grid, the power information including at least one of per-time slot electricity rate information and power demand information, and a controller configured to selectively perform one of an operation of outputting the broadcast content received through the broadcast receiving unit and an operation of storing the received broadcast content in an internal memory or an external memory considering the received power information.

According to an embodiment of the present invention, there is provided an electronic device comprising a broadcast receiving unit configured to receive a broadcast content, a communication unit configured to receive power information associated with a smart grid, the power information including at least one of per-time slot electricity rate information and power demand information, and a controller configured to provide a graphic user interface for selecting one of a function of outputting the broadcast content received through the broadcast receiving unit and a function of storing the received broadcast content in a memory when an electricity rate for a current time slot is higher than a reference value considering the received power information.

According to an embodiment of the present invention, there is provided an electronic device comprising a broadcast receiving unit configured to receive a broadcast content, a communication unit configured to receive power information associated with a smart grid, the power information including at least one of per-time slot electricity rate information and power demand information, and a controller configured to receive a reservation for broadcast viewing and, when a reserved time arrives, to selectively perform one of an operation of receiving and playing in real time a broadcast content corresponding to the reservation and an operation of storing the broadcast content corresponding to the reservation in an internal memory or an external memory, according to an electricity rate corresponding to the reserved time considering the received power information.

According to an embodiment of the present invention, there is provided an electronic device comprising a broadcast receiving unit configured to receive a broadcast content, a communication unit configured to receive power information associated with a smart grid, the power information including at least one of per-time slot electricity rate information and power demand information, and a controller configured to provide a user interface for changing power sources when a high rate time slot arrives based on the received power information while outputting the broadcast content.

According to the embodiments of the present invention, broadcast contents may be stored instead of being viewed during a time slot having a high electricity rate and the stored broadcast contents may be viewed during a time slot having a low electricity rate, thus saving power consumption.

BRIEF DESCRIPTION OF THE DRAWINGS

The implementation of this document will be described in detail with reference to the following drawings in which like numerals refer to like elements.

DETAILED DESCRIPTION

Figure 1:
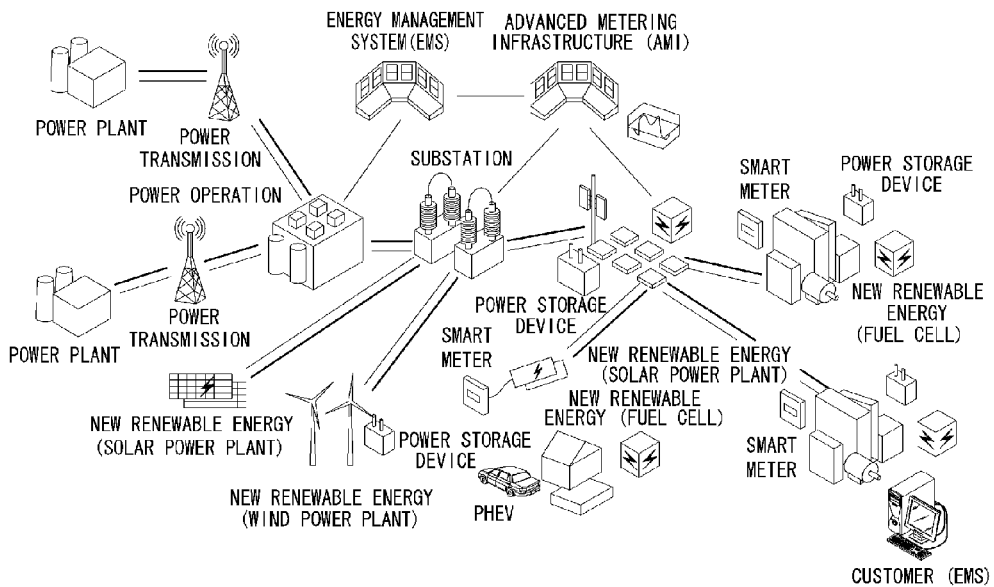
FIG. 1 is a view schematically illustrating a smart grid.

Hereinafter, exemplary embodiments of the present invention will be described with reference to the accompanying drawings, wherein like reference numerals are used to denote the same or substantially the same elements throughout the drawings and the specification.

FIG. 1 is a view schematically illustrating a smart grid. The smart grid includes a power plant, for example, such as a thermal power plant, a nuclear power plant, a hydroelectric power plant, a solar power plant, a wind power plant, etc.

The thermal power plant, the nuclear power plant, or the hydroelectric power plant supplies electricity to a power operation through power lines. The power operation carries electricity to a substation to distribute electricity to customers, such as homes or offices.

Electricity generated by new renewable energy sources is also supplied to the substation. The electricity is distributed from the substation to offices or homes via a power storage device.

Homes using a home area network (HAN) may generate electricity from solar panels or fuel cells mounted in a plug-in hybrid electric vehicles (PHEV) to utilize the generated electricity for themselves or to sell remaining electricity to other customers.

A smart meter is installed at each of the homes or offices to provide a user with power consumption and electricity rates in real time. The user may establish an electricity use plan based on the power consumption and electricity rates.

A bi-directional communication may be possible between the power plant, the power operation, the power storage device, and the customer. Accordingly, it is possible not only to unilaterally supply electricity to the customer but also to notify a circumstance of the customer to the power storage device, the power operation, or the power plant. Thus, electricity generation and electricity distribution may be carried out suitably to the customer's circumstance.

The smart grid includes an energy management system (EMS) and an advanced metering infrastructure (AMI). The EMS performs real-time power management for the customers and real-time anticipation of required power. The AMI measures power consumption in real time.

Metering devices used for a smart grid include an open-architecture based technology for encompassing customers so that a customer may efficiently use electricity and a power provider may effectively operate a system by monitoring any problems with the system.

The term "open architecture" herein refers to a standard under which electric devices produced from any manufacturers may be connected to one another over the smart grid network unlike a general communication network.

Accordingly, the metering devices used for the smart grid enables a customer-friendly efficiency concept, such as "Prices to Devices".

That is, price signals are related from an electricity market to each home in real time by an EMS installed in the home. The EMS may communicate with each electric device to control the device. A user may be aware of power information on each electric device by referring to the EMS and may perform a power information process, such as setup of a limit to power consumption or electricity rate, based on the power information, thus saving energy or rates.

The EMS may include a local EMS used for homes or offices and a central EMS that bi-laterally communicates with the local EMS to treat information collected by the local EMS.

Since power information may be communicated in real time between a supplier and a customer over the smart grid, a "real-time power network reaction" may be realized, thus saving high costs required for estimating a peak demand.

Figure 2:
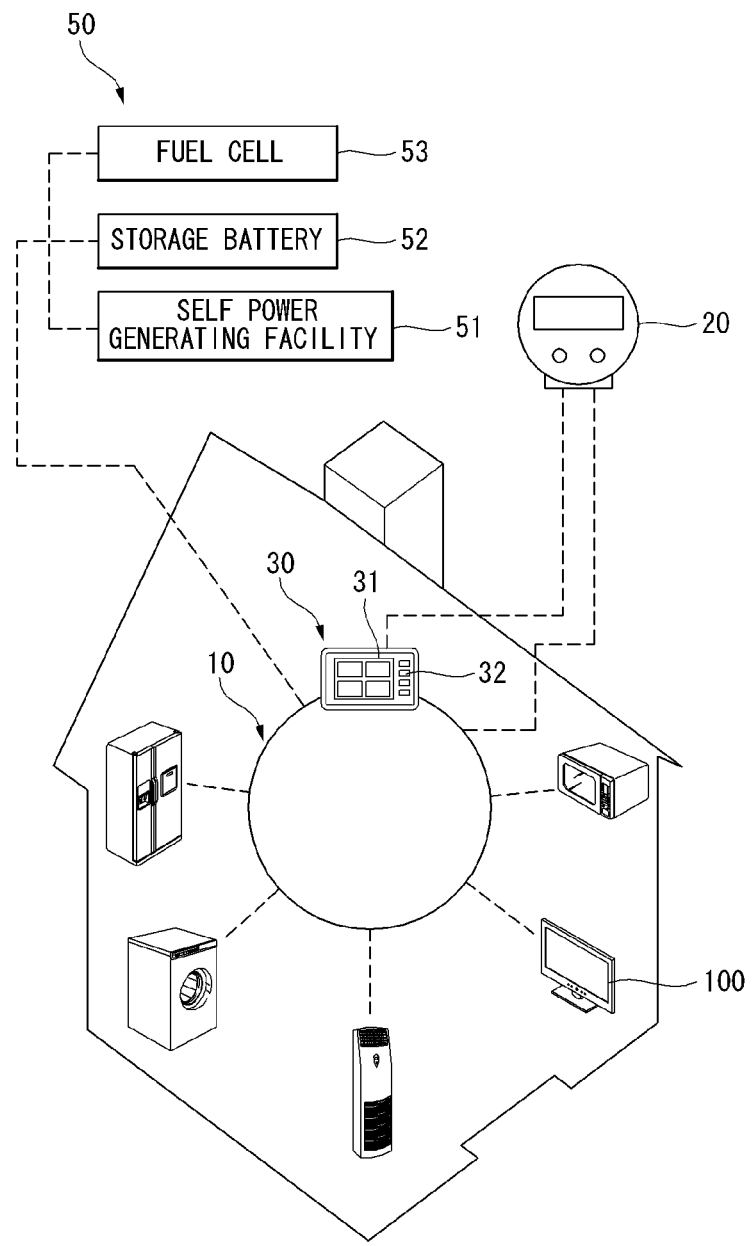
FIG. 2 is a view illustrating a power management network of a home that is a main customer of a smart grid service.

FIG. 2 is a view illustrating a power management network 10 of a home that is a main customer of a smart grid service.

The power management network 10 includes a smart meter 20 that may measure electricity supplied to the home and an electricity rate in real time and an EMS 30.

The electricity rate may be charged on an hourly basis. While power consumption is sharply increased, the per-hour electricity rate may be increased, and while power consumption is relatively small, such as a late night time, the per-hour electricity rate may be decreased.

The electricity rate may be equally charged between a time slot having high power demand and a time slot having low power demand. When electricity is saved by a user while the power demand increases, a rebate may be paid to the user as much electricity as he saved.

The EMS 30 that may be implemented as a terminal includes a screen 31 that displays a current electricity consumption circumstance and an external environment, such as temperature or humidity, and an input button 32 for user's manipulation.

The smart meter 20 and the EMS 30 are connected through an internal network in the home to an electronic device, such as a digital television (DTV), a refrigerator, a washing machine, a drier, an air conditioner, a cleaner, a robot cleaner, a cooking machine, an illumination device, or a light shielding device, to bi-laterally communicate with the electronic device. The EMS manages electricity consumed by electronic devices included in the power management network 10 and supplies electricity to the electronic devices. According to an embodiment, the EMS 30 may control the operation of the electronic devices. According to an embodiment, the EMS 30 may be embedded in a DTV or a computer.

According to an embodiment, the internal network may use a wireless or wired communication scheme, such as power line communication (PLC). The electronic devices are connected to one another to communicate with one another.

The power management network 10 includes an auxiliary power supply 50 prepared in the home. The auxiliary power supply 50 includes a self power generating facility 51, such as a solar power generation unit, and a storage battery 52 that stores electricity generated by the self power generating facility 51.

The auxiliary power supply 50 includes a fuel cell 53.

The auxiliary power supply 50 supplies electricity to the home while the home does not receive electricity from an external power supply, such as a power provider.

The smart meter 20 or the EMS 30 displays the amount of power that may be supplied from the auxiliary power supply 50 or the amount of power that is stored in the auxiliary power supply 50.

Figure 3:
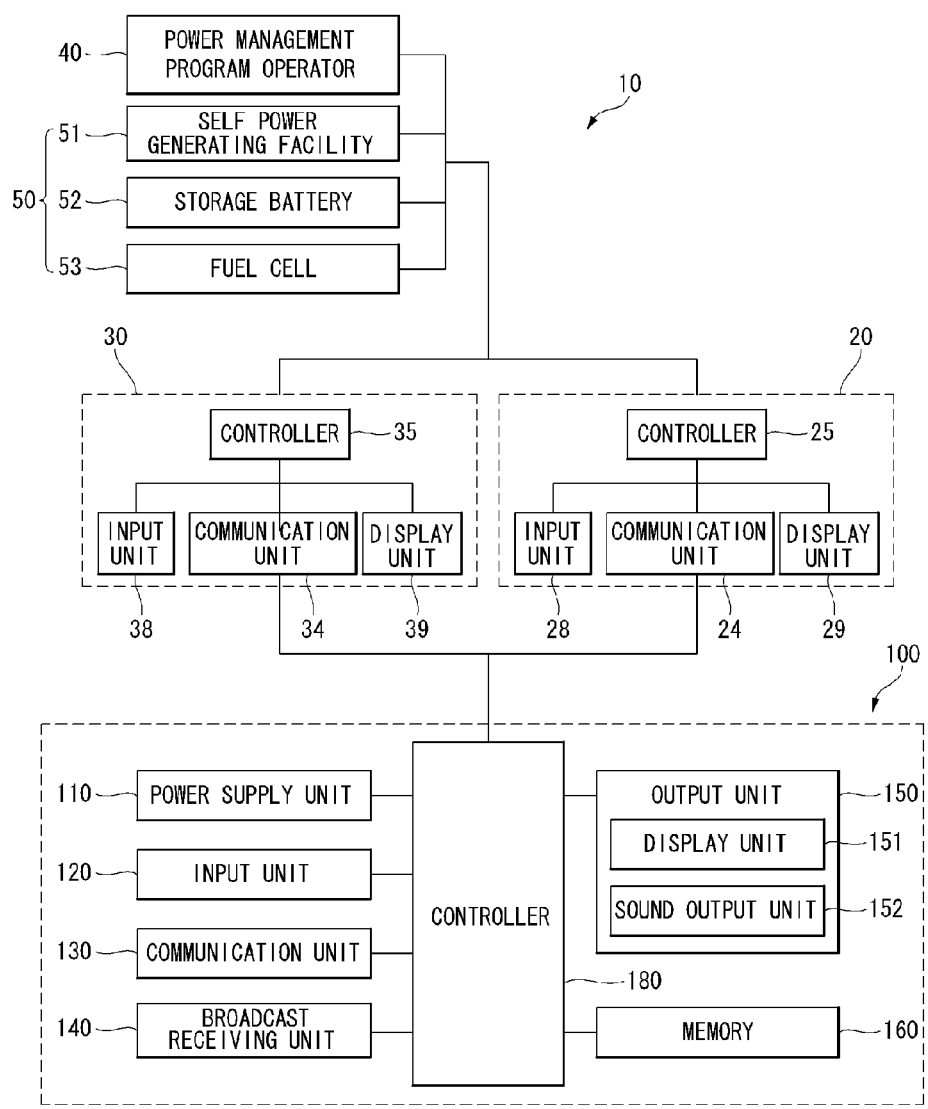
FIG. 3 is a block diagram illustrating the power management network and a DTV connected to the power management network.

FIG. 3 is a block diagram illustrating the power management network 10 and a DTV 100 connected to the power management network 10.

A power management program operator 40 is a power provider that includes a general power plant, such as thermal, nuclear, or hydroelectric power plant, or a power plant using new renewable energy sources, such as sunlight, wind, or geothermal heat. However, the present invention is not limited thereto.

The power management program operator 40 supplies electricity and information on a differential pricing system to each home so that a user may establish a strategy for saving electricity rates based on the information.

Further, the power management program operator 40 provides the user with a guide for saving electricity rates. For example, the power management program operator 40 may suggest a reference for a high rate time slot so that the user may reasonably consume electricity. A power supply of the power management program operator 40 is hereinafter referred to as "external power supply".

The "high rate time slot" refers to a time slot during which a per-hour electricity rate is more than a predetermined rate due to the explosion in power demand so that the electricity rate is sharply increased.

The auxiliary power supply 50 supplies electricity to the home separately from the external power supply. The auxiliary power supply 50 and the external power supply are connected to the smart meter 20 and the EMS 30 to communicate with the smart meter 20 and the EMS 30. The smart meter 20 and the EMS 30 may communicate with the electronic devices. According to an embodiment, each of the electronic devices may have a power supply unit that receives electricity from the external power supply and/or the auxiliary power supply 50.

The EMS 30 includes a controller 35, an input unit 38, a communication unit 34, and a display unit 39. The smart meter 20 includes a controller 25, an input unit 28, a communication unit 24, and a display unit 29.

The EMS 30 or the smart meter 20 is connected to the DTV 100 to communicate with the DTV 100. The DTV 100 includes a communication unit 130 that may communicate with the communication unit 34 of the EMS 30 or the communication unit 24 of the smart meter 20.

The communication unit 130 of the DTV 100 receives power information, such as electricity rate information, that varies in real time from the EMS 30 or the smart meter 20.

Referring to FIG. 3, the DTV 100 further includes a power supply unit 110, an input unit 120, a broadcast receiving unit 140, an output unit 150, a memory 160, and a controller 180.

The power supply unit 110 receives electricity from the external power supply and/or the auxiliary power supply 50 and supplies necessary electricity to the components of the DTV 100.

The input unit 120 generates input data allowing a user to control the operation of the power management network 10.

The communication unit 130 receives power information associated with the smart grid, such as electricity rate information, as described above. According to an embodiment, the communication unit 130 may include one or more module that allows for communication between the DTV 100 and a network (for example, Internet).

According to an embodiment, the communication unit 130 may receive smart grid information in a wired manner, such as Ethernet or PLC, or in a wireless manner, such as Zigbee.

The smart grid information includes the electricity rate information. According to an embodiment, the smart grid may include various sources and various transmission/receipt methods.

For example, the electricity rate information may include at least one of per-time slot electricity rate information and power demand information.

For example, the communication unit 130 may receive the smart grid information from a smart operation center 11 or a smart grid network 12 that will be described below with reference to FIG. 4, or a specific server existing over an external network.

According to an embodiment, the communication unit 130 may receive the smart grid information through various communication protocols, such as various wired or wireless protocols, including mobile Internet protocols and mobile communication network protocols.

The broadcast receiving unit 140 receives a broadcast signal and/or broadcast-related information from an external broadcast management server through a broadcast channel.

According to an embodiment, the broadcast channel may include a satellite channel and/or a terrestrial channel. According to an embodiment, the broadcast management server may include a server that generates a broadcast signal and/or broadcast-related information and transmits the generated signal and/or information to a terminal, such as the DTV 100, or a server that receives a previously generated broadcast signal and/or broadcast-related signal and transmits the received signal and/or information to the terminal. According to an embodiment, the broadcast signal may include a TV broadcast signal, a radio broadcast signal, a data broadcast signal, or a combined broadcast signal of a TV broadcast signal, a radio broadcast signal, and a data broadcast signal.

According to an embodiment, the broadcast-related information may include information on a broadcast channel, a broadcast program, or a broadcast service provider.

For example, the broadcast-related information may include an electronic program guide (EPG) or an electronic service guide (ESG).

The broadcast receiving unit 140 receives a broadcast signal through various broadcast systems. According to an embodiment, the broadcast receiving unit 140 may be configured to be suitable for a digital broadcast system or other broadcast systems providing the broadcast signal.

The broadcast signal and/or the broadcast-related information received through the broadcast receiving unit 140 are stored in the memory 160.

The output unit 150 generates a visual, auditory, or tactile output. The output unit 150 includes a display unit 151 and a sound output unit 152. According to an embodiment, the output unit 150 may further include a haptic module that generates a tactile output (for example, vibration).

The display unit 151 displays information processed by the DTV 100.

According to an embodiment, the display unit 151 may include at least one of a liquid crystal display (LCD), a thin film transistor-liquid crystal display (TFT-LCD), an organic light-emitting diode (OLED) display, a flexible display, and a 3-dimensional display.

According to an embodiment, two or more display units 151 may be provided in the DTV 100.

According to an embodiment, the DTV 100 may not include the display unit 151 and the display unit 151 may be provided separately from the DTV 100. The controller 180 may control the display unit 151 wiredly or wirelessly.

According to an embodiment, in cases where the display unit 151 is provided separately from the DTV 100, the DTV 100 and the display unit 151 may or may not share a power supply source.

The sound output unit 152 outputs audio data that is received from an external source (not shown) or generated by the DTV 100. For example, the sound output unit 152 outputs a sound signal associated with a function performed by the DTV 100.

According to an embodiment, the sound output unit 152 may include a speaker or a buzzer, and may output a sound through an earphone jack so that a user may listen to the sound by using an earphone connected to the earphone jack.

The memory 160 stores a program for an operation of the controller 180 and temporarily or permanently stores input/output data, such as audios, still images, moving pictures, broadcast-related information, etc.

According to an embodiment, the memory 160 may include at least one of storage media including a flash memory, a hard disk, a micro multimedia card type memory, a card type memory, such as a SD or XD memory, a random access memory (RAM), a static random access memory (SRAM), a read-only memory (ROM), an electrically erasable programmable read-only memory (EEPROM), a programmable read-only memory (PROM), a magnetic type memory, a magnetic disk, and an optical disk.

According to an embodiment, the memory 160 may be provided separately from the DTV 100. For example, a digital video recorder (DVR) serving as the memory 160 is provided separately from the DTV 100.

The memory 160 may also be refereed to as "storage".

According to an embodiment, the DTV 100 may be operated in association with a web storage that performs a storage function of the memory 160 over the Internet.

The controller 180 controls a general operation of the DTV 100. For example, the controller 180 performs control and processing associated with, for example, broadcast receipt, broadcast recording, or access to the Internet.

According to an embodiment, the controller 180 may include a multimedia module for playing multimedia. The multimedia module may be provided in the controller 180 or separately from the controller 180. The multimedia module may include an audio/video decoder.

The exemplary embodiments described herein may be implemented in software, hardware, or a combination thereof, or implemented in a recording medium that may be read by a computer or a similar device thereof.

When implemented in hardware, the embodiments may be embodied by at least one of an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electrical unit for performing a function. The embodiments may also be implemented by the controller 180.

When implemented in software, the embodiments may be embodied by separate software codes or modules, each performing a function or operation. The software codes may be implemented by a software application written in a proper program language. The software codes may be stored and executed by the controller 180.

Figure 4:
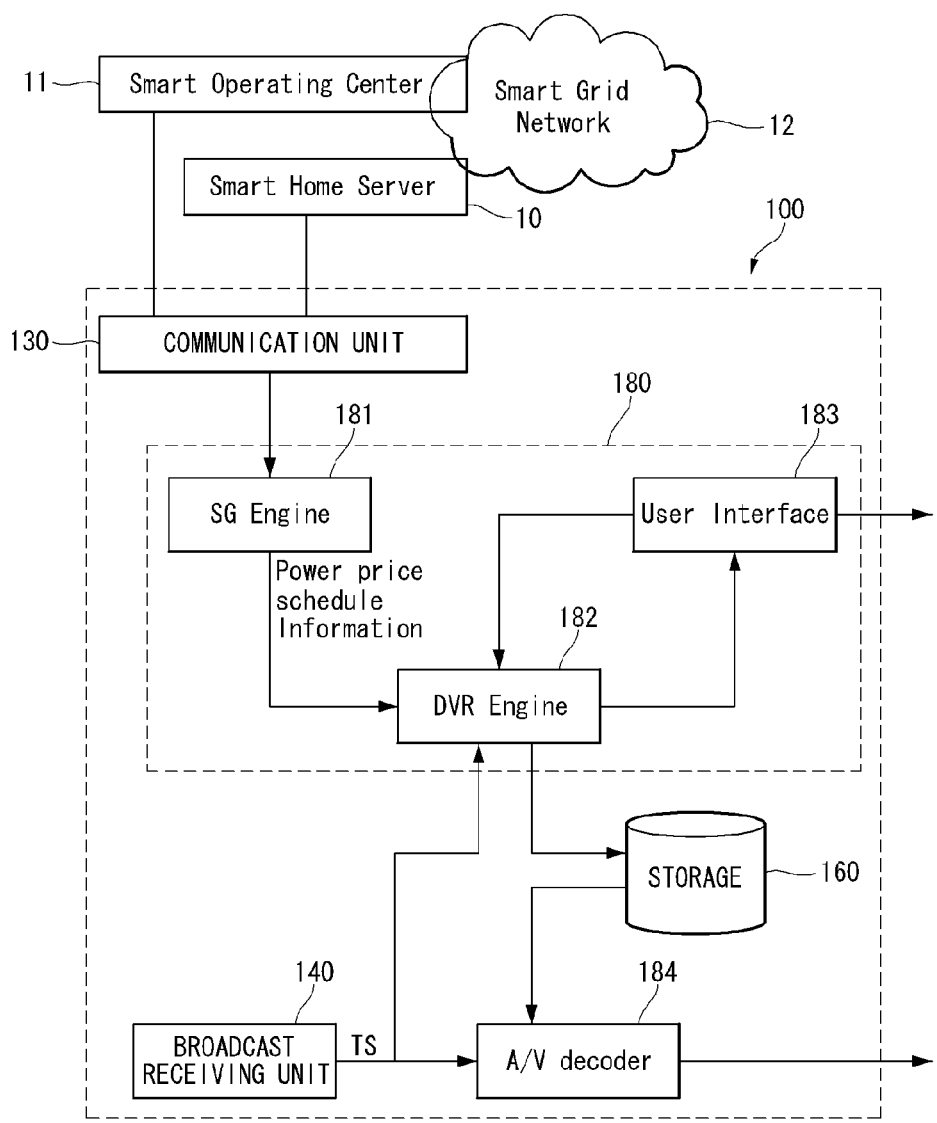
FIG. 4 is a view illustrating the DTV in association with smart grid information and broadcast contents.

FIG. 4 is a view illustrating the DTV 100 in association with smart grid information and broadcast contents.

Referring to FIG. 4, the controller 180 of the DTV 100 includes a smart grid engine 181, a DVR engine 182, and a UI processing unit 183.

The smart grid engine 181 processes the smart grid information received through the communication unit 130 to be capable of being used by the DTV 100 and stores the processed information in the storage 160 that is provided in or outside of the DTV 100.

As shown in FIG. 4, the communication unit 130 receives the smart grid information from a smart network 12 through a smart operation center 11 provided outside of the home or through a smart home server 10a provided in the home.

The smart operation center 11 includes the EMS provided outside of the home, and the smart home server 10 includes the power management network 10 as described above.

The DVR engine 182 performs a function associated with storage of the broadcast contents, such as generation of information necessary for storage of the broadcast contents.

For example, according to an embodiment, the DVR engine 182 may receive broadcast contents requested by the UI processing unit 183 through the broadcast receiving unit 140 in the form of transport streams (TSs) and may store the received broadcast contents in the storage 160.

According to an embodiment, the DVR engine 182 may calculate an optimum time for viewing the broadcast contents stored in the storage 160 using the smart grid information processed and stored by the smart grid engine 181 and may notify a user of arrival of the optimum time.

The UI processing unit 183 performs functions associated with generation, storage, and output of various user interfaces to be described below and a function of processing a user input received through the user interfaces.

The DTV 100 further includes an A/V decoder 184. According to an embodiment, the A/V decoder 184 may be provided in the controller 180 or as a module separate from the controller 180.

The A/V decoder 184 decodes and outputs transmission streams received through the broadcast receiving unit 140 or the contents stored in the memory 160.

Although it has been described that the DTV 100 is used as an electronic device in the home, the present invention is not limited thereto. Hereinafter, various exemplary embodiments using the DTV 100 will be described.

Figure 5:
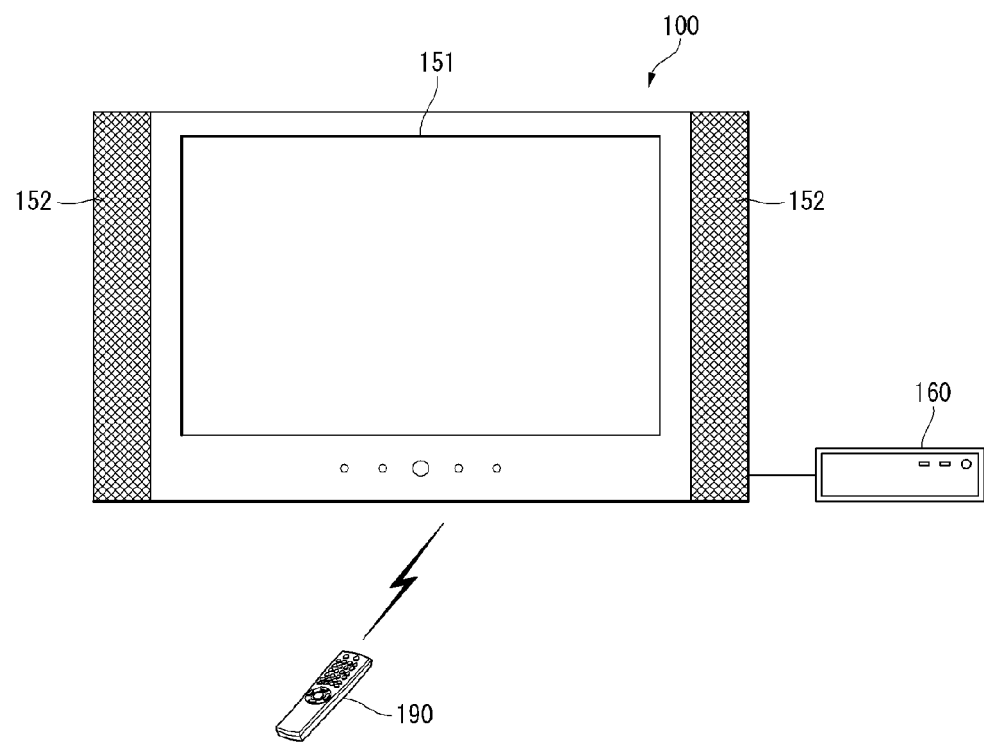
FIG. 5 is a view illustrating an example of installing the DTV and the storage.

FIG. 5 is a view illustrating an example of installing the DTV 100 and the storage 160. As described above, the storage 160 serves as the memory 160 and may be provided separately from the DTV 100.

Referring to FIG. 5, a user controls the DTV 100 using a remote controller 190.

Figure 6:
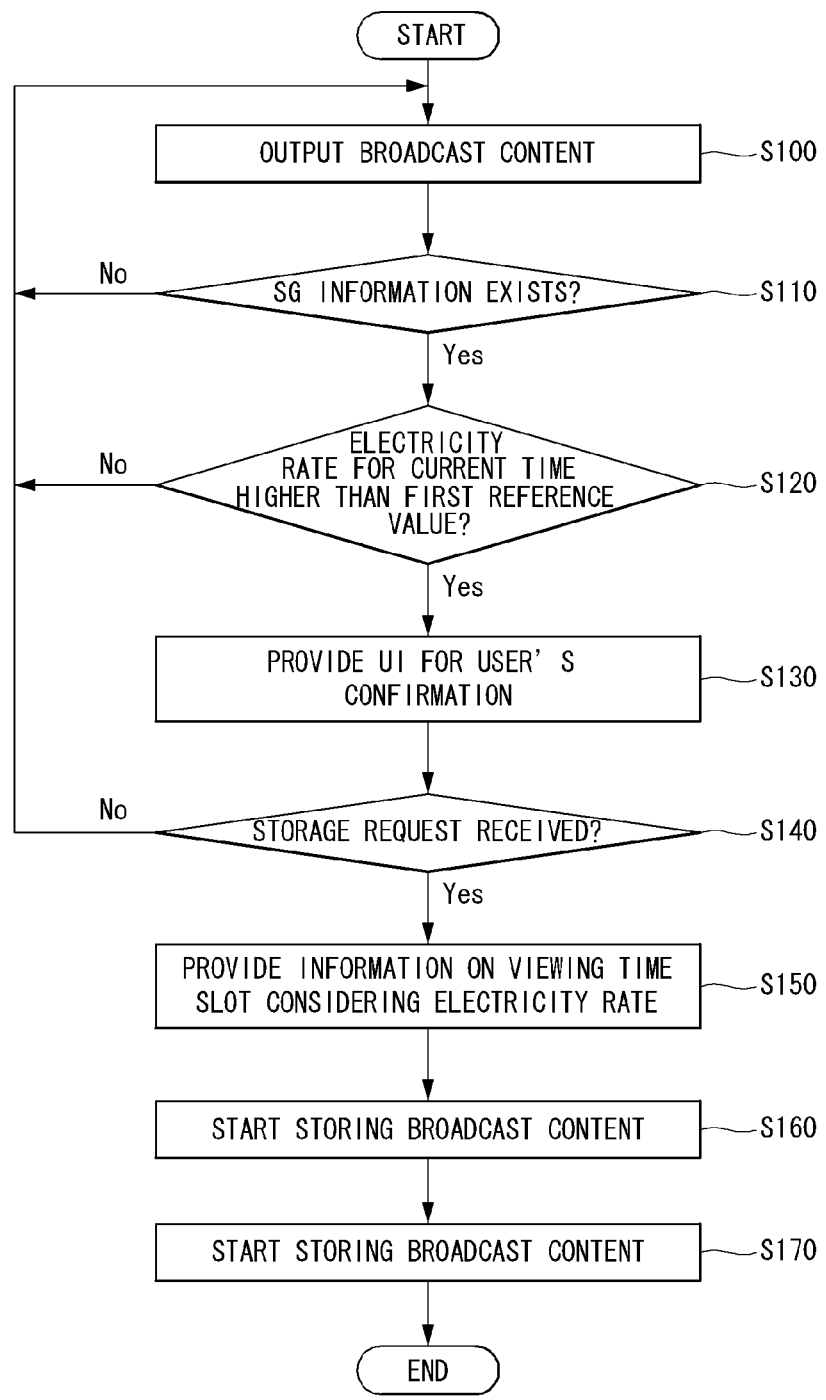
FIG. 6 is a flowchart illustrating a method of controlling an electronic device according to an embodiment of the present invention.

FIG. 6 is a flowchart illustrating a method of controlling an electronic device according to an embodiment of the present invention. FIGS. 7 to 10A are views illustrating a method of controlling an electronic device according to an embodiment of the present invention. FIG. 11 is a flowchart illustrating step S160 of FIG. 6.

According to an embodiment, the method of controlling an electronic device as described in connection with FIGS. 6 to 11 may be implemented in the environment and the DTV 100 as described in connection with FIGS. 1 to 5. Hereinafter, the method and an operation of the DTV 100 will be described in greater detail with reference to the accompanying drawings.

Referring to FIG. 6, the controller 180 enables the A/V decoder 184 to decode broadcast contents received through the broadcast receiving unit 140 and enables the output unit 150 to output the decoded broadcast contents (S100). For example, a user may view broadcast contents in real time in step S100.

The controller 180 determines whether there is smart grid information received through the communication unit 130 (S110). As described above, the smart grid information may be stored in the storage 160 (or memory 160).

If it is determined in step S110 that there is no smart grid information, the controller 180 returns to step S100.

If it is determined in step S110 that there is smart grid information, the controller 180 determines whether an electricity rate for a current time is higher than a first reference value by referring to the smart grid information (S120).

Since the smart grid information may include a per-time slot electricity rate as described above, the controller 180 may make such a determination using the received smart grid information.

According to an embodiment, the first reference value may be an electricity rate corresponding to the above-mentioned high rate time slot. For example, the first reference value may include a value determined to correspond to a most expensive electricity rate.

According to an embodiment, the first reference value may be calculated or set up by performing for a predetermined time period a statistical analysis on the electricity rate information included in the smart grid information received from the smart grid network 12.

For example, the controller 180 may obtain information on the most expensive electricity rate by analyzing the electricity rate information included in the smart grid information for the predetermined time period.

According to an embodiment, the controller 180 may periodically (for example, monthly, quarterly, or half-yearly) or non-periodically update the first reference value.

If it is determined in step S120 that the electricity rate for the current time is lower than the first reference value, the controller 180 returns to step S100.

If it is determined in step S120 that the electricity rate for the current time is higher than the first reference value, the controller 180 provides a user interface allowing a user to select one of viewing and recording (S130).

The user interface inquires whether a user will continue to view current broadcast contents he views (or broadcast contents selected by the user through an EPG/ESG) or will store the broadcast contents, and receives a response from the user.

Figure 7:
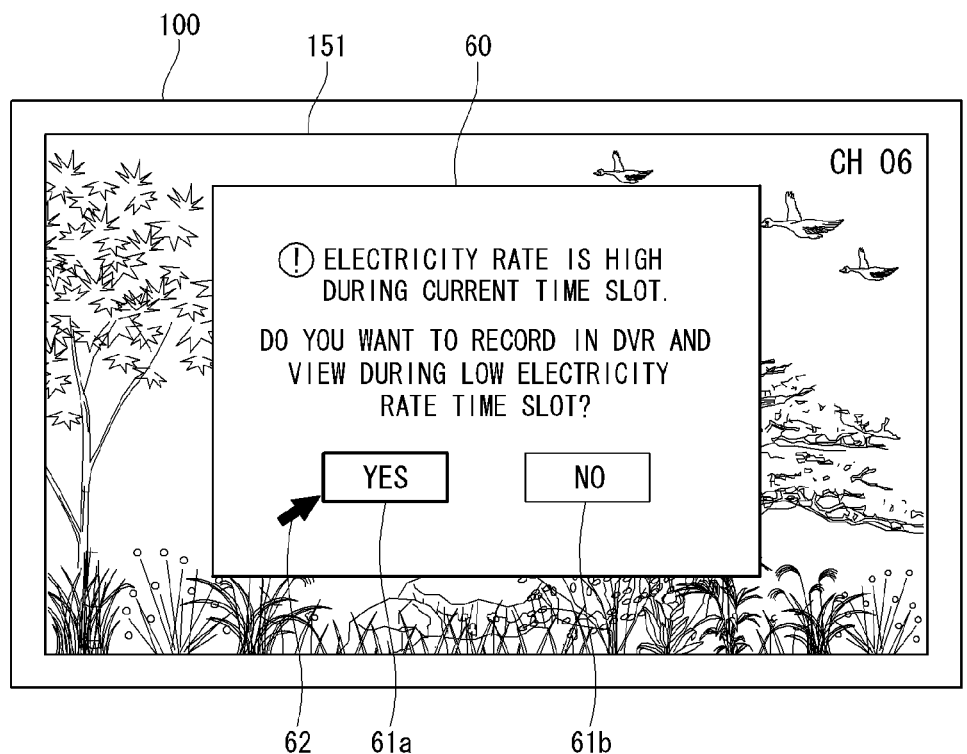
FIGS. 7 to 10B are views illustrating a method of controlling an electronic device according to an embodiment of the present invention.

FIG. 7 illustrates an example of displaying a user interface 60 for user's selection between viewing and recording on a screen.

Referring to FIG. 7, if the electricity rate for the current time becomes higher than the first reference value while the broadcast contents are outputted, the controller 180 displays the user interface 60 on the screen.

The user interface includes an icon 61a corresponding to "Yes" and an icon 61b corresponding to "No".

The user manipulates the remote controller 190 to select one of the icons 61a and 61b.

For example, the user may manipulate the remote controller 190 to move a cursor 62 displayed on the display unit 151 to one of the icons 61a and 61b, and may press a confirmation key in the remote controller 190 to select one of the icons 61a and 61b.

According to an embodiment, the user may select one of the icons 61a and 61b by pressing one of key buttons corresponding to the icons 61a and 61b among various key buttons provided in the remote controller 190.

The controller 180 determines whether to receive a storage request of the broadcast contents through the user interface 60 (S140).

When receiving a request for continuously viewing the broadcast contents through the user interface 60, the controller 180 returns to step S100.

According to an embodiment, when receiving a request for storing the broadcast contents through the user interface 60, the controller 180 may store the broadcast contents the user currently views (or broadcast contents selected by the user through the EPG/ESG) in the storage 160.

According to an embodiment, the controller 180 may provide various types of information to the user before storing the broadcast contents.

The controller 180 provides information on time slots for viewing considering electricity rates (S150). According to an embodiment, the controller 180 may recommend a play time of the stored broadcast contents considering the electricity rates based on the information provided in step S150.

Figure 8:
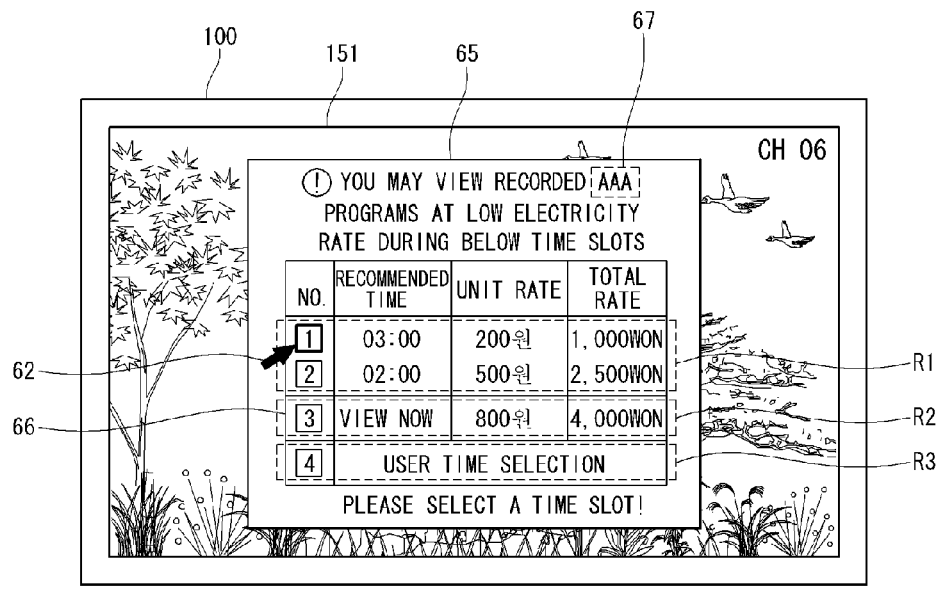

For example, referring to FIG. 8, the controller 180 may display a window 65 including information on time slots for viewing considering the electricity rates on the display unit 151.

The window 65 provides an information region 66 that includes at least one item corresponding to at least one time slot during which the stored broadcast contents may be viewed at a reasonable electricity rate and an item R3 allowing the user to directly select a viewing time.

As shown in FIG. 8, the information region 66 provides recommendation information R1 that includes information on a recommended time during which the stored broadcast contents may be viewed at a reasonable electricity rate, information on a unit electricity rate corresponding to the recommended time, and information on a total rate charged when the broadcast contents are viewed at the recommended time.

Further, the information region 66 provides electricity rate information R2 associated with current viewing that includes information on a unit electricity rate charged when the broadcast contents are currently viewed and information on a total rate charged when the broadcast contents are currently viewed.

The window 65 further includes information on a title 67 of a program stored using broadcast-related information (or broadcast additional information) received through the broadcast receiving unit 140.

Figure 9A:
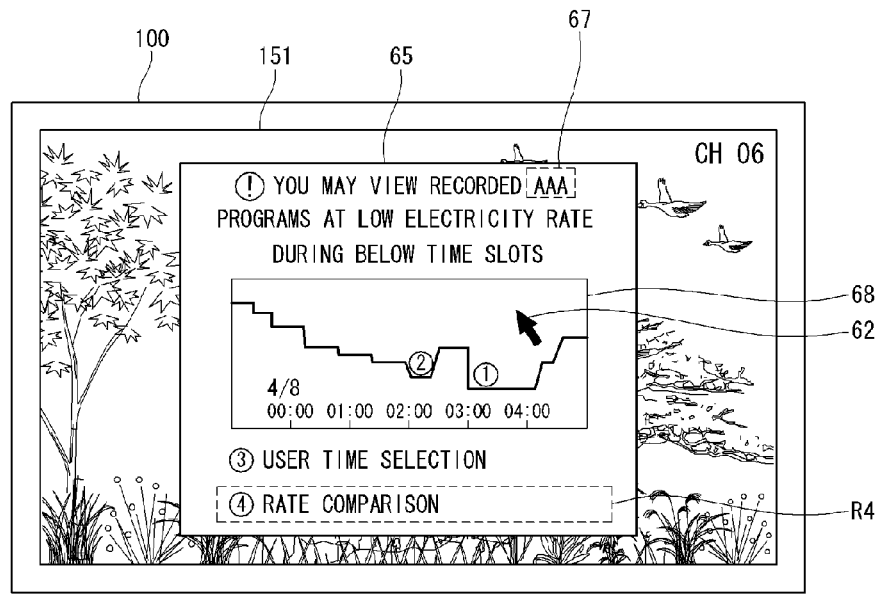

FIG. 9A illustrates a variation of the window 65. The window 65 shown in FIG. 8 provides items for selection of time slots in a text type, and the window 65 shown in FIG. 9A provides items for selection of time slots in a type of a graph 68.

The controller 180 may provide the electricity rate information R1 and R2 on the window 65 including the graph 68. The controller 180 provides a selection menu R4 for comparing electricity rates through the window 65 including the graph 68.

Figure 9B:
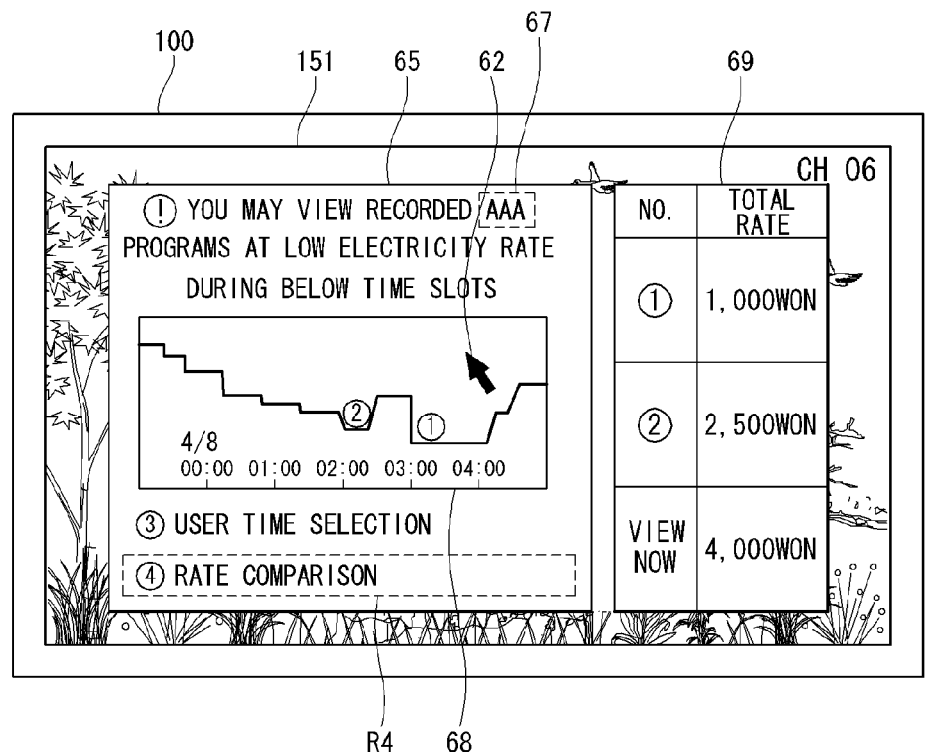

When a user selects the menu R4, the controller 180 provides a sub window 69 including information similar to the electricity rate information R1 and R2 as shown in FIG. 9B.

Figure 10A:
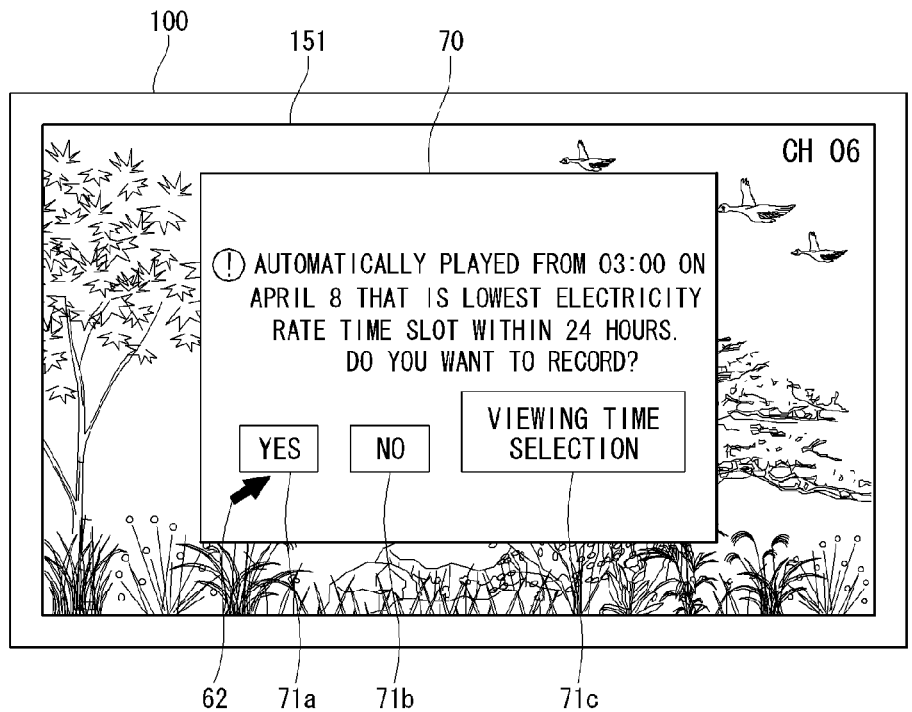
Figure 11:
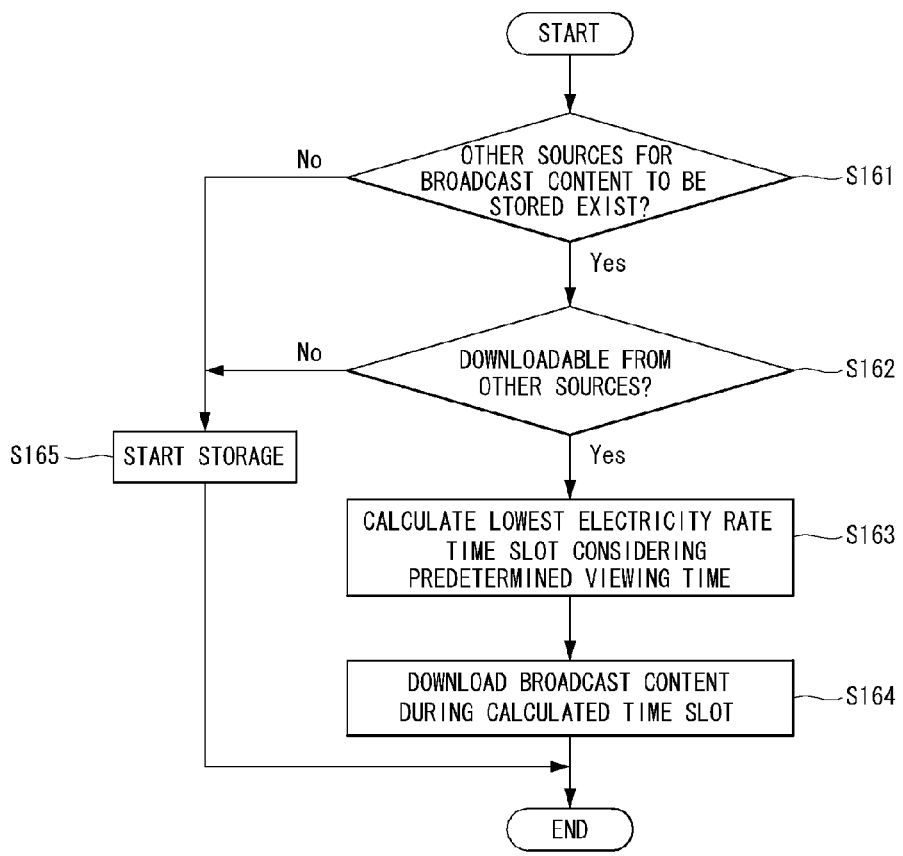
FIG. 11 is a flowchart illustrating step S160 of FIG. 6.

Referring to FIG. 10A, instead of the user interface 65 allowing a user to select a time slot for viewing as shown in FIG. 8 or 9A, the controller 180 may provide the user with a user interface 70 that displays a time slot for lowest electricity rate automatically calculated so that the user may make a final decision on whether he will store the broadcast contents.

Referring to FIG. 10A, the user interface 70 includes icons 71a and 71b to select whether to store the broadcast contents or not and an icon 71c allowing the user to select a viewing time as shown in FIGS. 8 and 9A.

After steps S140 and S150, the controller 180 starts storing the broadcast contents (S160) in, for example, the storage 160 (or memory 160).

According to an embodiment, if it is determined in step S120 that the electricity rate for current time is higher than the first reference value, the controller 180 may perform step S160 without providing the user interface allowing the user to select viewing or recording.

When the user interface for the user to select viewing or recording, the controller 180 may provide a user interface for providing information on automatic recording to the user.

Figure 10B:
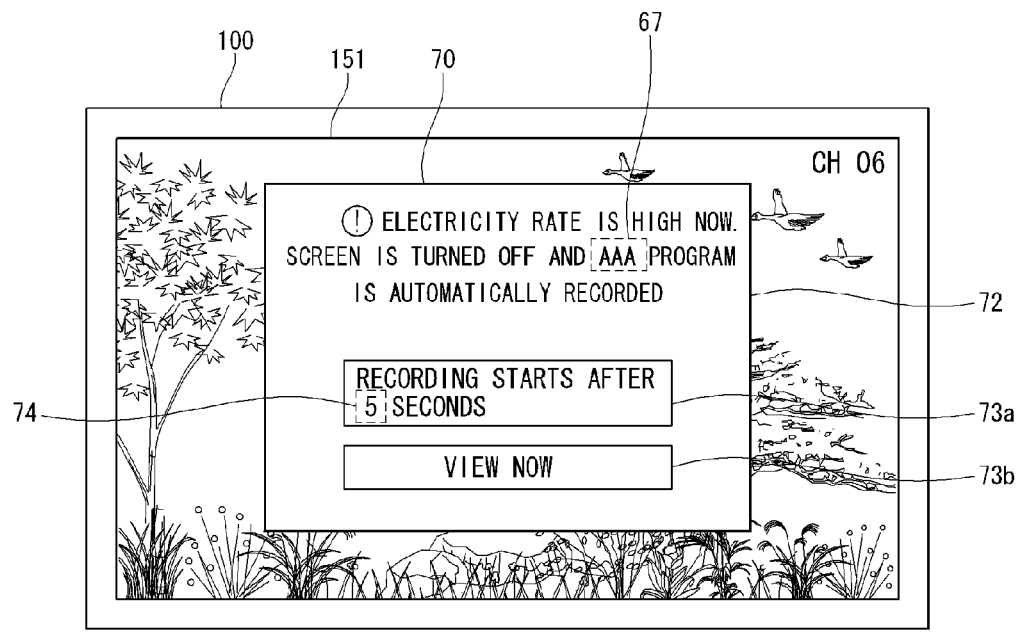

FIG. 10B illustrates an example of a user interface providing information on automatic recording information to the user.

Referring to FIG. 10B, the controller 180 provides a window 72 that includes the information on automatic recording.

The window 72 includes a first selection menu 73a notifying a start of automatic recording by the operation of a timer 74 and a second selection menu 73b for instant viewing instead of the automatic recording.

When the user selects the first selection menu 73a or the operation of the timer 74 is complete, the controller 180 starts storing the broadcast contents.

When the user selects the second menu 73b, the controller 180 continues to output the broadcast contents instead of storing the broadcast contents.

According to an embodiment, the controller 180 may stop outputting the broadcast contents simultaneously with, or immediately before or right the start of storage of the broadcast contents (S170).

According to an embodiment, while performing step S170, the controller 180 may control in a power saving mode at least one of components other than components required to perform the storing operation among components included in the DTV 100.

For example, the controller 180 may stop outputting the broadcast contents and may stop supplying electricity to the display unit 151, or may stop supplying electricity to the A/V decoder 184.

According to an embodiment, when the display unit 151 is provided separately from the DTV 100, the controller 180 may output a control signal for stopping supplying electricity to the display unit 151, wherein the control signal may be transferred to the display unit 151.

According to the embodiment described in connection with FIGS. 6 to 10A, a user may store broadcast contents in a storage medium while an electricity rate is high based on smart grid information provided from the smart grid network and may view the stored broadcast contents while an electricity rate is low.

According to an embodiment, the controller 180 may consider an electricity rate while performing the operation of storing the broadcast contents in step S160.

FIG. 11 is a flowchart illustrating an example of performing step S160 considering electricity rates.

Referring to FIG. 11, the controller 180 determines whether there is a second source other than a first source from which the broadcast contents are received in step S100 (S161). According to an embodiment, a plurality of second sources may be provided.

For example, a plurality of broadcast service providers may provide the same broadcast contents, and the second source may include a broadcast channel provided by a general broadcast station, a cable channel, an Internet server, and the like.

According to an embodiment, the controller 180 may obtain information on various second sources beforehand or at a time point of performing step S161.

If it is determined in step S161 that there is a second source, the controller 180 determines whether the broadcast contents may be downloaded from the second source (S162).

If there is no second source or the broadcast contents may not be downloaded from the second source, the controller 180 receives the broadcast contents from a predetermined source, for example, the first source, and starts storing the received broadcast contents (S165).

If it is determined in step S162 that the broadcast contents may be downloaded from the second source, the controller 180 calculates a time slot for a lowest electricity rate considering the viewing time selected in FIG. 8 or FIG. 9A (S163).

For example, when a user selects "03:00" in FIG. 8, the broadcast contents need to be downloaded before "03:00", and thus, the controller 180 may calculate the time slot for the lowest electricity rate taking into consideration a time taken to complete download of the broadcast contents before "03:00".

The controller 180 downloads the broadcast contents during the time slot calculated in step S163 and stores the downloaded contents in the storage 160 (or memory 160) (S164).

Figure 12:
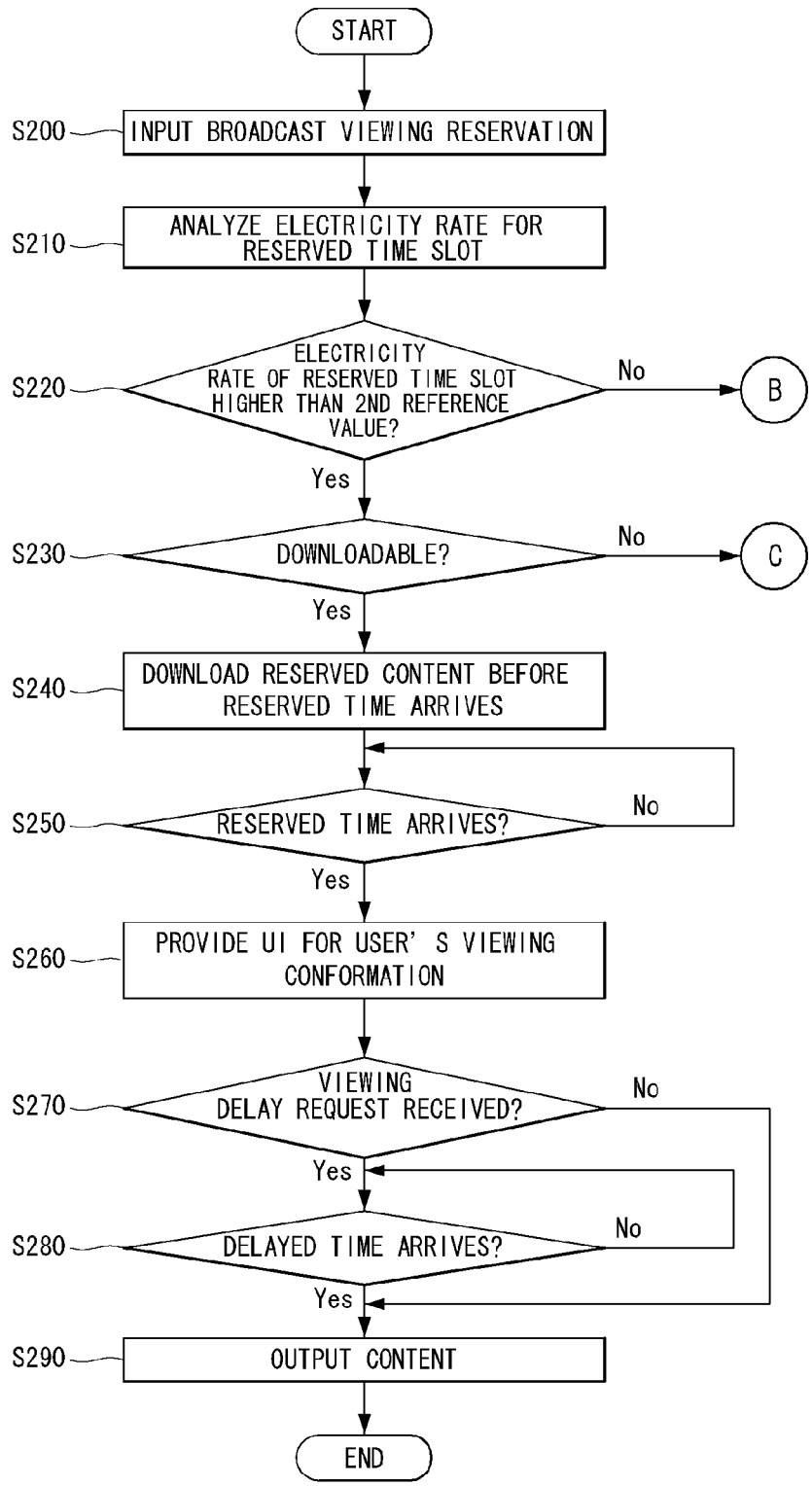
FIGS. 12, 16, and 17 are flowcharts illustrating a method of controlling an electronic device according to an embodiment of the present invention.
Figures 13, 14:
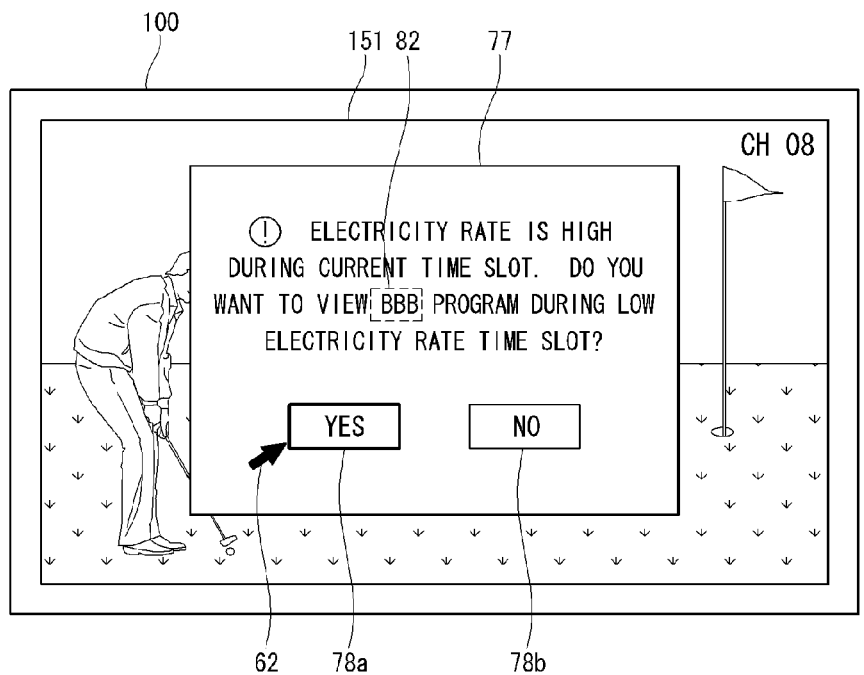
FIGS. 13 to 15 are views illustrating a method of controlling an electronic device according to an embodiment of the present invention.
Figure 15:
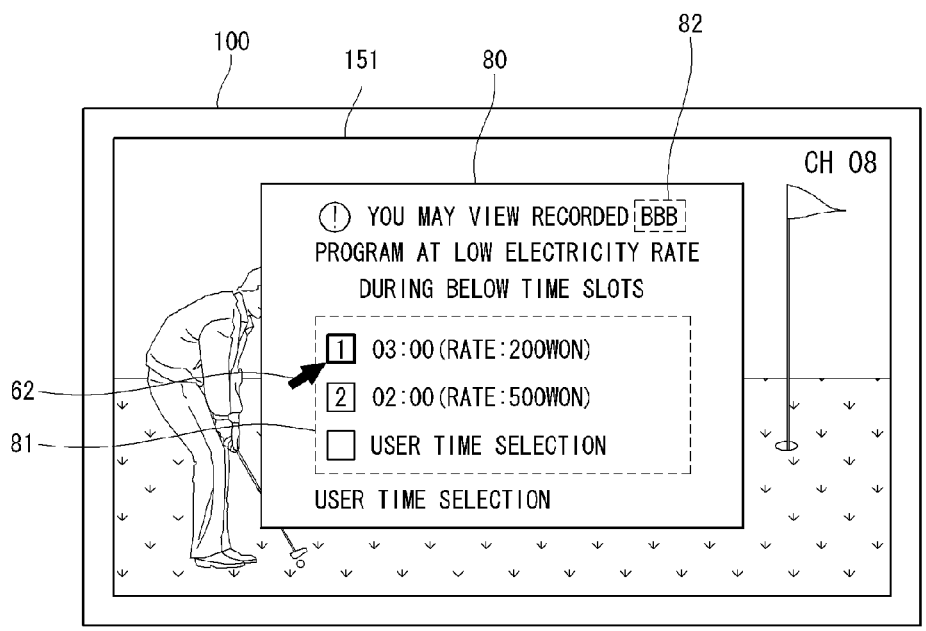
Figure 16:
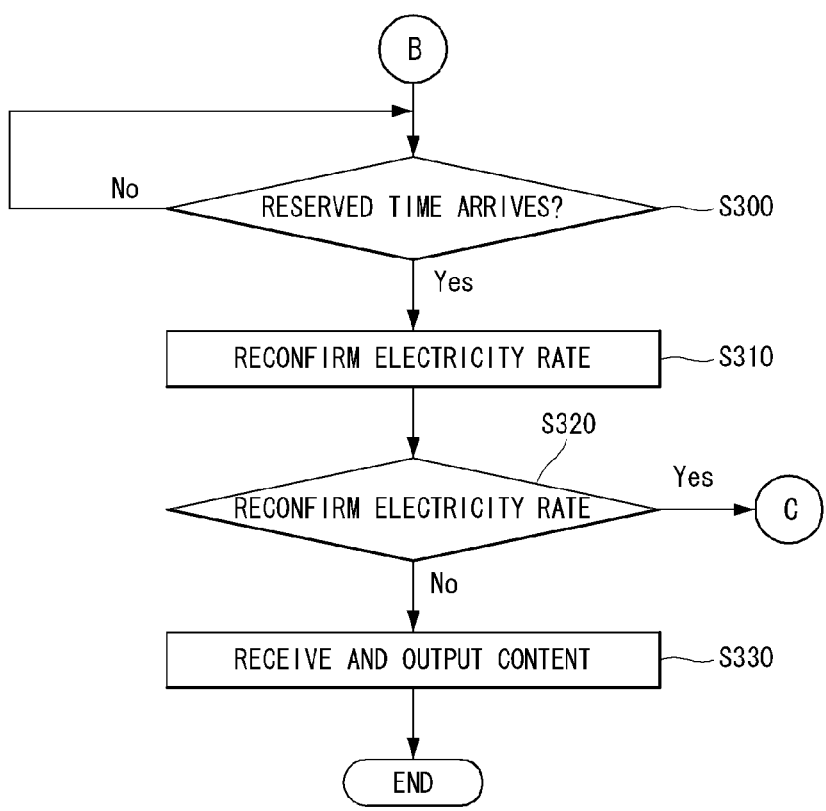
Figure 17:
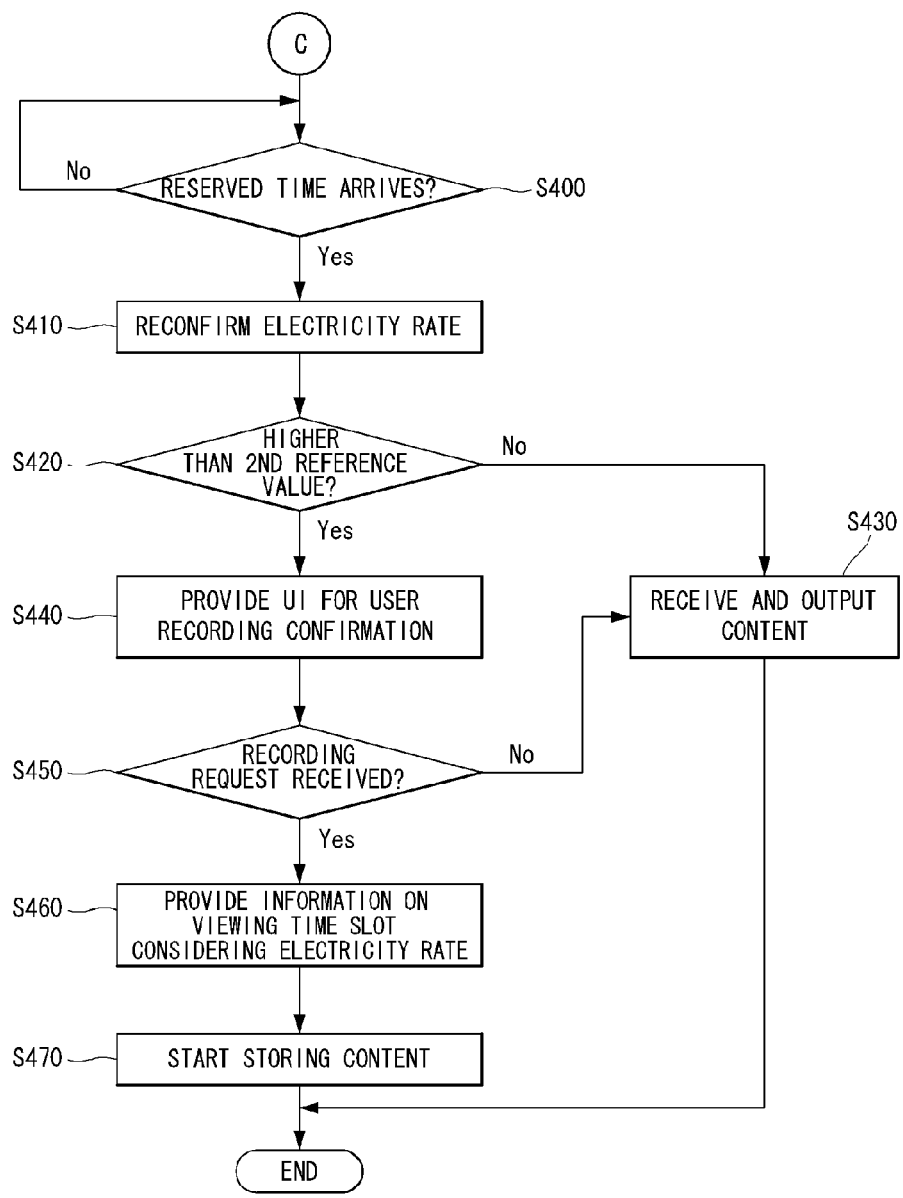

FIGS. 12, 16, and 17 are flowcharts illustrating a method of controlling an electronic device according to an embodiment of the present invention. FIGS. 13 to 15 are views illustrating a method of controlling an electronic device according to an embodiment of the present invention.

The method of controlling an electronic device according to the embodiment described in connection with FIGS. 12 to 17 may be implemented in the environment and the DTV 100 described in connection with FIGS. 1 to 5. Hereinafter, the method and an operation of the DTV 100 will be described in greater detail with reference to the accompanying drawings.

Referring to FIG. 12, the controller 180 receives a viewing reservation for specific broadcast contents (S200).

For example, the controller 180 may display EPG (or ESG) information shown in FIG. 13 on the display unit 151. A user may make a viewing reservation for the specific broadcast contents (for example, PR5 75) based on the EPG (or ESG) information.

According to an embodiment, the viewing reservation may be performed by a user simply selecting the specific broadcast contents or by the user selecting the specific broadcast contents and inputting a viewing time of the specific broadcast contents.

According to an embodiment, the viewing reservation for the specific broadcast contents using the EPG (ESG) may be performed using a known method.

According to an embodiment, the EPG (or ESG) information may include per-time slot electricity rate information 76 as shown in FIG. 13.

The EPG (or ESG) information is received from a broadcast station through the broadcast receiving unit 140. The broadcast station receives the per-time slot electricity rate information 76 through the smart grid network 12, mixes the per-time slot electricity rate information 76 with the EPG (or ESG) information, and transmits the mixed information.

According to an embodiment, the controller 180 may extract the per-time slot electricity rate information 76 from the smart grid information received through the communication unit 34, may mix the extracted information 76 with the EPG (or ESG) information received through the broadcast receiving unit 140, and may provide the mixed information in the form as shown in FIG. 13.

The controller 180 analyzes an electricity rate for a viewing-reserved time slot associated with the viewing reservation performed in step S200 using the smart grid information (S210).

According to an embodiment, the viewing-reserved time slot may include a time slot from a time that the broadcast station transmits the specific broadcast contents to a time that the transmission is complete.

According to an embodiment, if there is a broadcast station operating a server that stores the specific broadcast contents and allows a user to download the contents anytime he wants, the user may select a start time of the viewing-reserved time slot in step S200 to make a viewing reservation.

The controller 180 determines whether an electricity rate for the viewing-reserved time slot is higher than a second reference value (S220). According to an embodiment, the second reference value may be equal or similar to the first reference value described above in connection with FIGS. 6 to 11.

If it is determined in step S220 that the electricity rate for the viewing-reserved time slot is higher than the second reference value, the controller 180 determines whether the specific broadcast contents may be downloaded (S230).

Whether the specific broadcast contents are downloadable is equal to whether the broadcast contents are downloadable as described above in connection with FIGS. 6 to 11.

If the specific broadcast contents are downloadable, the controller 180 downloads the reserved specific broadcast contents before a start time of the viewing-reserved time slot, i.e., a viewing-reserved time (S240).

According to an embodiment, while performing steps S210 to S240, the controller 180 may stop supplying electricity to at least one module that has nothing to do with storage of the specific broadcast contents (for example, the display unit 151 and/or the A/V decoder 184), thus minimizing power consumption.

The controller 180 determines whether the viewing-reserved time arrives or not (S250), and, if the viewing-reserved time arrives, provides a user interface for user's confirmation (S260).

FIG. 14 illustrates an example of a user interface 77 provided in step S260. Through the user interface 77, the controller 180 notifies a user that an electricity rate is high during a current time slot and inquires whether the user will view the downloaded broadcast contents 82 while an electricity rate is low, as shown in FIG. 14.

According to an embodiment, the user may select one of selection icons 78*a* and 78*b* included in the user interface 77 to view the broadcast contents 82 from the viewing-reserved time or to delay viewing of the broadcast contents 82 to a time slot having a low electricity rate.

The controller 180 determines whether to receive a viewing delay request for the broadcast contents 82 through the user interface 77 (S270).

When receiving a viewing request for the broadcast contents 82 through the user interface 77, the controller 180 outputs the broadcasting contents 82 (S290).

When receiving the viewing delay request through the user interface 77, the controller 180 provides a user interface 80 for inquiring when the user will view the broadcast contents 82 as shown in FIG. 15.

As shown in FIG. 15, the user interface 80 includes a region 81 that includes information on a time slot having a low electricity rate and an item allowing the user to directly input a viewing time. FIG. 15 is similar to FIG. 8. According to an embodiment, the user interface 80 shown in FIG. 15 may be provided in a graph type as shown in FIG. 9A.

Referring to FIG. 15, when receiving the viewing delay request, the controller 180 determines whether a delayed time for viewing selected by the user arrives through the user interface 80 (S280). If the delayed time for viewing arrives, the controller 180 outputs the broadcast contents (S290).

According to an embodiment, the controller 180 may stop supplying electricity to at least one module that has nothing to do with storage of the specific broadcast contents (for example, the display unit 151 and/or the A/V decoder 184), thus minimizing power consumption.

FIG. 16 is a flowchart illustrating an operation of the controller 180 performed when the electricity rate for the viewing-reserved time slot is lower than the second reference value.

When the electricity rate for the viewing-reserved time slot is lower than the second reference value, the controller 180 determines whether the viewing-reserved time arrives (S300), and, if the viewing-reserved time arrives, reconfirms the electricity rate for current time (S310).

The controller 180 determines whether the electricity rate for current time is higher than the second reference value (S320), and, if the electricity rate for current is lower than the second reference value, receives the reserved broadcast contents through the broadcast receiving unit 140 and outputs the received contents (S330).

A situation where the electricity rate for current time is higher than the second reference value will be described below with reference to FIG. 17.

FIG. 17 is a flowchart illustrating an operation of the controller 180 performed when it is determined in step S230 that download is impossible or when it is determined in step S320 that the electricity rate for current time is higher than the second reference value.

Referring to FIG. 17, the controller 180 determines whether the viewing-reserved time arrives (S400), and, if the viewing-reserved time arrives, reconfirms the electricity rate for current time (S410).

Then, the controller 180 determines whether the electricity rate for current time is higher than the second reference value (S420), and, if the electricity rate for current time is lower than the second reference value, receives and outputs the reserved broadcast contents (S430).

If the electricity rate for current time is higher than the second reference value, the controller 180 provides a user interface allowing a user to confirm recording (S440).

According to an embodiment, the user interface provided in step S440 may be the same or substantially the same as the user interface provided in step S130.

Then, the controller 180 determines whether to receive a recording request through the user interface provided in step S440 (S450), and, when not receiving the recording request, receives and outputs the reserved broadcast contents (S430).

When receiving the recording request through the user interface provided in step S440, the controller 180 provides information on viewing time slots considering electricity rates (S460) and starts storing the reserved broadcast contents (S470).

Steps S460 and S470 are identical in technical features to steps S150 and S160.

According to an embodiment, the controller 180 may stop supplying electricity to at least one module that has nothing to do with storage of the reserved broadcast contents (for example, the display unit 151 and/or the A/V decoder 184), thus minimizing power consumption.

According to an embodiment, in a case where an electricity rate for the reserved time slot is higher than the second reference value when the reserved time according to the viewing reservation arrives, the controller 180 may output an audio signal included in the reserved broadcast contents through the sound output unit 152 instead of outputting a video signal included in the reserved broadcast contents through the memory 160, thus stopping supply of electricity to the memory 160 or minimizing power consumption.

Figure 18:
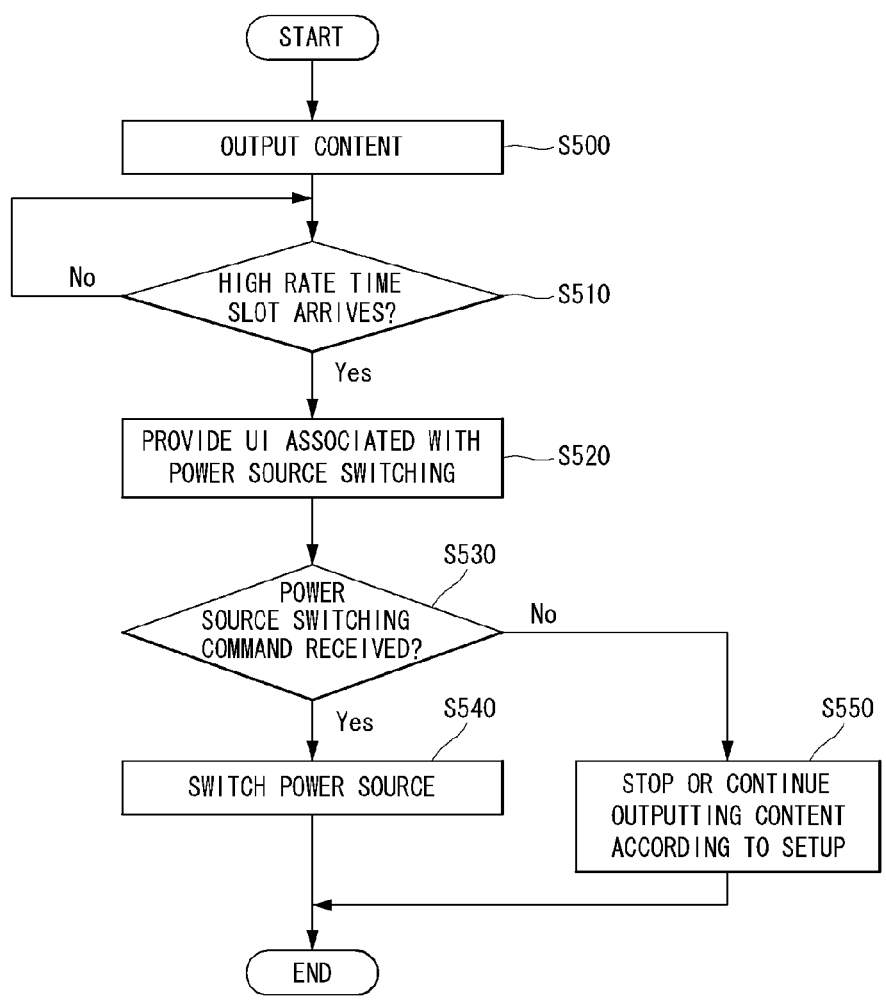
FIG. 18 is a flowchart illustrating a method of controlling an electronic device according to an embodiment of the present invention.
Figure 19:
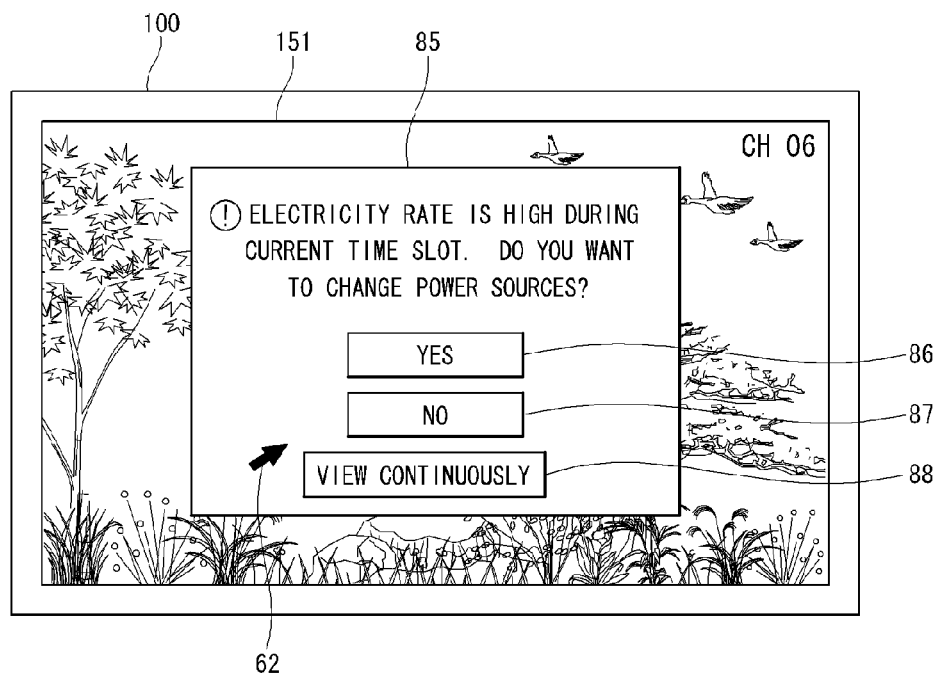
FIGS. 19 and 20 are views illustrating a method of controlling an electronic device according to an embodiment of the present invention.
Figure 20:
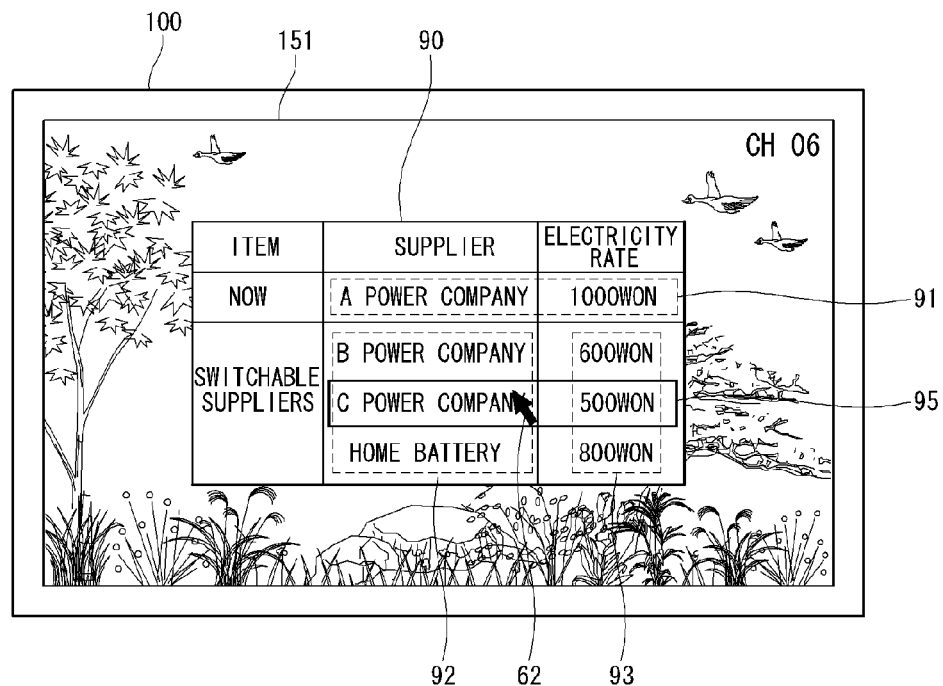

FIG. 18 is a flowchart illustrating a method of controlling an electronic device according to an embodiment of the present invention. FIGS. 19 and 20 are views illustrating a method of controlling an electronic device according to an embodiment of the present invention.

According to an embodiment, this controlling method may be implemented in the environment and the DTV 100 as described in connection with FIGS. 1 to 5. Hereinafter, the method and an operation of the DTV 100 will be described in greater detail with reference to the accompanying drawings.

Referring to FIG. 18, the controller 180 outputs contents through the output unit 150 (S500). For example, according to an embodiment, the controller 180 may decode broadcast contents received through the broadcast receiving unit 140 by the A/V decoder 184 and may output the decoded contents through the output unit 150.

The controller 180 determines whether a high rate time slot arrives (S510).

According to an embodiment, the controller 180 may determine that the high rate time slot arrives right before or right after a current time belongs to the high rate time slot, or when the high rate time slot is expected to arrive after a predetermined time.

When it is determined in step S510 that the high rate time slot arrives, the controller 180 provides a user interface associated with power sources and switching (S520).

For example, the controller 180 provides a user interface 85 that notifies a user that the high rate time slot currently arrives and allows the user to change power sources as shown in FIG. 19.

The user may change the power sources or maintain a current power source using the user interface 85.

The controller 180 determines whether to receive a power source switching command through the user interface 85 (S530).

For example, when the user controls a cursor 62 to select a "Yes" button 86, the controller 180 determines that the power source switching command is received.

When the user selects the "Yes" button 86, the controller 180 may provide information 90 on switchable power sources as shown in FIG. 20.

The information 90 includes information 91 on a power source that is currently supplying electricity.

The information 90 includes information 92 on at least one alternate power source and electricity rate information 93 corresponding to the alternate power source.

Various alternate power sources may be provided including a plurality of different power companies and a battery installed in the home as shown in FIG. 20.

The user may select a power source he desires from the information 90. For example, the user may control the cursor 62 to select a "Power Company C" having a lowest electricity rate. The controller 180 displays an indicator 95 indicating a power source selected by the user among the plurality of power sources shown in FIG. 20.

When receiving a power source switching command, the controller 180 switches a current power source to a power source corresponding to the received power source switching command (S540).

When receiving no power source switching command, the controller 180 stops or continues output of the contents (S550).

For example, when the user selects a "No" button 87 in the user interface 85, the controller 180 may stop output of the contents.

For example, when the user selects a "VIEW CONTINUOUSLY" button 88 in the user interface 85, the controller 180 maintains the current power source and continues to output the contents.

According to an embodiment, the user interfaces described herein may be provided or not depending on a user's setup. For example, a user may set up to provide or not to provide a specific user interface.

According to an embodiment, the reference value associated with the electricity rate as described herein, such as the first or second reference value, may include one or more reference value. According to an embodiment, the first and second reference values may be the same as or different from each other.

According to an embodiment, the reference value associated with the electricity rate as described herein, such as the first or second reference value, may be preloaded by a manufacturer of a product (for example, the DTV 100), set by a user, or set based on information received from an external source.

The above-described method of controlling the electronic device may be written as computer programs and may be implemented in digital microprocessors that execute the programs using a computer readable recording medium.

The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device comprising:
a broadcast receiving unit to receive a broadcast content;
a communication unit to receive power information associated with a smart grid, the power information including at least one of electricity rate per time slot information and power demand information; and
a controller to:
display a user interface allowing a user to select one of viewing and recording the broadcast content on a display unit when a current time belongs to a time slot having an electricity rate higher than a first reference value;
display a window including information on time slots for viewing electricity rates on the display unit in response to receiving a request for storing the broadcast content through the user interface;
wherein the information includes a first electricity rate information, a second electricity rate information and a selection menu for comparing the first electricity rate information and the second electricity rate information,
wherein the first electricity rate information includes a recommended time during which the stored broadcast content may be viewed at a reasonable electricity rate, an electricity rate corresponding to the recommended time, and a total rate charged when the stored broadcast content is viewed at the recommended time,
wherein the second electricity rate information includes an electricity rate charged when the broadcast content is currently viewed, and a total rate charged when the broadcast content is currently viewed, and
wherein the first electricity rate information and the second electricity rate information are provided in a graph through the window;
display a sub window including a result of the comparing on the display unit when the selection menu is selected; and
store the broadcast content in a storage unit,
wherein the controller selectively performs one of an operation of outputting the broadcast content received through the broadcast receiving unit and an operation of recording the broadcast content in an internal memory or an external memory considering the received power information,
wherein the controller performs the operation of recording the broadcast content when a current time belongs to a time slot having an electricity rate higher than the first reference value, and the controller performs the operation of outputting the broadcast content in real time when the current time belongs to a time slot having an electricity rate lower than the first reference value, and wherein the first reference value is set up by performing for a predetermined time period a statistical analysis on an electricity rate information included in the power information received from a smart grid network.

2. The electronic device of claim 1, wherein the controller selectively performs one of the operation of outputting the broadcast content and the operation of recording the broadcast content while the broadcast content is received in real time.

3. The electronic device of claim 1, wherein the controller selectively performs one of the operation of outputting the broadcast content and the operation of recording the broadcast content when the broadcast content is selected through an electronic program guide.

4. The electronic device of claim 1, wherein the controller performs the operation of recording the broadcast content when the current time belongs to a time slot having an electricity rate higher than a second reference value while performing the operation of outputting the broadcast content.

5. The electronic device of claim 4, wherein the controller stops the operation of outputting the broadcast content when the current time belongs to the time slot having the electricity rate higher than the second reference value and to perform the operation of recording the broadcast content when the current time reaches a fourth time slot having an electricity rate equal to a third reference value lower than the second reference value.

6. The electronic device of claim 4, wherein the electronic device includes a plurality of units, and wherein the controller controls at least one of other units than units required to perform the operation of recording the broadcast content in a power saving mode when performing the operation of recording the broadcast content.

7. The electronic device of claim 6, wherein the at least one of other units includes a display unit that is provided in or outside of the electronic device.

8. The electronic device of claim 6, wherein the controller performs the operation of recording the broadcast content after a user's confirmation when performing the operation of recording the broadcast content.

9. The electronic device of claim 6, wherein the controller recommends a play time of the recorded content considering the received power information when performing the operation of recording the broadcast content.

10. The electronic device of claim 9, wherein the controller provides an electricity information corresponding to the play time when recommending the play time.

11. The electronic device of claim 9, wherein the controller anticipates information on an electricity rate for a future predetermined period based on the received power information and to recommend the play time based on the anticipated information.

12. The electronic device of claim 1, wherein the power information is received from the smart grid or from a server provided separately from the electronic device, or the power information is received as additional information associated with the broadcast content.

13. The electronic device of claim 1, wherein the controller provides a graphic user interface for selecting one of an operation of outputting the broadcast content received through the broadcast receiving unit when an electricity rate for a current time slot is lower than a reference value considering the received power information and an operation of recording the broadcast content in a memory when the electricity rate for the current time slot is higher than the reference value considering the received power information, and wherein the reference value is set up by performing for a predetermined time period a statistical analysis.

14. The electronic device of claim 13, wherein the controller provides the graphic user interface when the electronic device is on or when the broadcast is played.

15. The electronic device of claim 13, wherein the graphic user interface is provided or not provided depending on a user's setup.

16. The electronic device of claim 1, wherein the controller receives a reservation for broadcast viewing and, when a reserved time arrives, selects one of an operation of receiving and playing in real time a broadcast content corresponding to the reservation and an operation of recording the broadcast content corresponding to the reservation in an internal memory or an external memory, according to an electricity rate corresponding to the reserved time considering the received power information.

17. The electronic device of claim 16, wherein the electronic device includes a plurality of units, wherein the controller controls at least other units than units required to perform the operation of the recording the broadcast content in a power saving mode when performing operation of the recording the broadcast content.

18. The electronic device of claim 16, wherein the controller plays at least one of a video signal and an audio signal included in the broadcast content corresponding to the reservation when performing the operation of playing the broadcast content.

19. The electronic device of claim 1, wherein the controller provides a second window including at least one alternate power source and electricity rate information corresponding to the at least one alternate power source for changing power sources when a high rate time slot arrives based on the received power information while outputting the broadcast content, wherein the high rate time slot is set up by performing for a predetermined time period a statistical analysis on an electricity rate information included in the power information received from a smart grid network, and wherein the at least one alternate power source includes a broadcast channel provided by a general broadcast station, a cable channel, an Internet server.

20. The electronic device of claim 19, wherein the at least one alternate power source includes a plurality of different power companies or a battery installed in the home.

* * * * *